(12) United States Patent
Lebrasseur et al.

(10) Patent No.: US 9,217,395 B2
(45) Date of Patent: Dec. 22, 2015

(54) CONTROL VALVE FOR AN INTERNAL COMBUSTION ENGINE EXHAUST GAS RECIRCULATION SYSTEM

(71) Applicant: Valeo Systemes de Controle Moteur, Cergy Saint Christophe (FR)

(72) Inventors: Patrick Lebrasseur, Montagny en Vexin (FR); Franck Girardon, Conflans Sainte Honorine (FR); Mathieu Lallemant, Maisons-Laffitte (FR)

(73) Assignee: Valeo Systemes de Controle Moteur, Cergy Pontoise (FR)

( * ) Notice: Subject to any disclaimer, the term of this patent is extended or adjusted under 35 U.S.C. 154(b) by 0 days.

(21) Appl. No.: 14/360,792

(22) PCT Filed: Nov. 19, 2012

(86) PCT No.: PCT/FR2012/052667
§ 371 (c)(1),
(2) Date: May 27, 2014

(87) PCT Pub. No.: WO2013/076412
PCT Pub. Date: May 30, 2013

(65) Prior Publication Data
US 2014/0311467 A1    Oct. 23, 2014

(30) Foreign Application Priority Data

Nov. 25, 2011    (FR) ...................... 11 60786

(51) Int. Cl.
*F02B 47/08* (2006.01)
*F02M 25/07* (2006.01)

(52) U.S. Cl.
CPC ......... *F02M 25/071* (2013.01); *F02M 25/0744* (2013.01); *F02M 25/0707* (2013.01); *F02M 25/0709* (2013.01); *F02M 25/0788* (2013.01); *Y02T 10/121* (2013.01)

(58) Field of Classification Search
CPC ............... Y02T 10/20; F02M 25/0709; F02M 25/0707; F02M 25/0744; F02M 25/0748; F02M 25/07
USPC ............. 123/568.26, 568.23, 568.11, 568.12; 137/865; 251/129.11
See application file for complete search history.

(56) References Cited

U.S. PATENT DOCUMENTS 4,749,004 A * 6/1988 Peash ............................ 137/865
6,926,250 B1 * 8/2005 Hashimoto et al. ...... 251/129.11
(Continued)

FOREIGN PATENT DOCUMENTS

DE    10 2008 035 553 A1    2/2010
DE    10 2008 059 657 A1    6/2010
(Continued)

OTHER PUBLICATIONS

International Search Report for corresponding International Application No. PCT/FR2012/052667, mailed Apr. 5, 2013 (3 pages).
(Continued)

*Primary Examiner* — Marguerite McMahon
*Assistant Examiner* — James Kim
(74) *Attorney, Agent, or Firm* — Osha Liang LLP

(57) ABSTRACT

A valve able to control an exhaust gas recirculation system of an internal combustion engine equipped with a turbine installed in an exhaust circuit of the internal combustion engine, is disclosed. The valve includes a body through which a first stream of exhaust gas tapped off upstream of the turbine can flow and through which a second stream of exhaust gas tapped off downstream of the turbine can flow. The valve is configured to control the flow of the first and second streams of exhaust gas through the valve body.

9 Claims, 4 Drawing Sheets

(56) References Cited

U.S. PATENT DOCUMENTS

| | | | |
|---|---|---|---|
| 6,973,786 B1* | 12/2005 | Liu et al. | 60/605.2 |
| 7,168,250 B2* | 1/2007 | Wei et al. | 60/605.2 |
| 7,334,565 B2* | 2/2008 | Hanasato | 123/336 |
| 8,082,947 B2* | 12/2011 | Chang et al. | 137/614.01 |
| 8,651,455 B2* | 2/2014 | Albert et al. | 251/248 |
| 2004/0050375 A1* | 3/2004 | Arnold | 123/568.12 |
| 2004/0093866 A1* | 5/2004 | Ishikawa | 60/605.2 |
| 2006/0231069 A1* | 10/2006 | Hanasato | 123/336 |
| 2012/0138029 A1* | 6/2012 | Albert et al. | 123/568.23 |

FOREIGN PATENT DOCUMENTS

| | | |
|---|---|---|
| EP | 1 362 985 A2 | 11/2003 |
| EP | 2 365 196 A1 | 9/2011 |
| FR | 2 772 429 A1 | 6/1999 |

OTHER PUBLICATIONS

Written Opinion for corresponding International Application No. PCT/FR2012/052667, mailed Apr. 5, 2013 (5 pages).

* cited by examiner

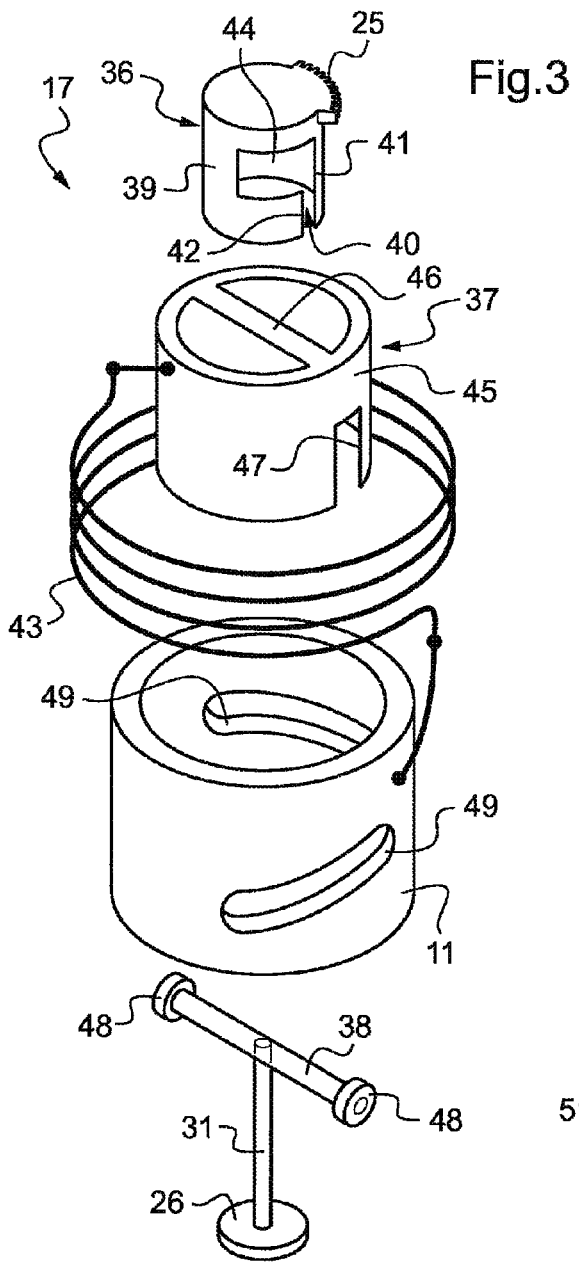
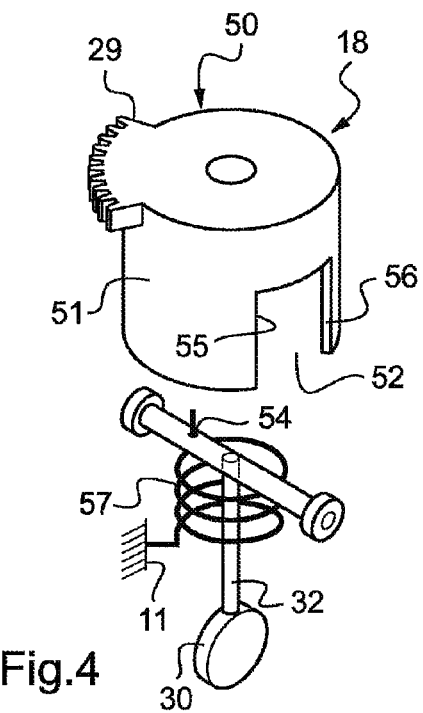
Fig.3
Fig.4

CONTROL VALVE FOR AN INTERNAL COMBUSTION ENGINE EXHAUST GAS RECIRCULATION SYSTEM

The present invention concerns a valve for controlling the quantity of exhaust gas recycled in an exhaust gas recirculation system of a turbocharged internal combustion engine.

Exhaust gas recirculation systems (EGR) are already known which are intended, in internal combustion engines, to recycle some of the exhaust gas to the intake of the cylinders of the internal combustion engine. Such a recirculation of gases, which are generally inert and therefore do not participate in the combustion, allows a reduction in the combustion temperature, the effect of which is to reduce the level of nitrogen oxides (NOx) present in the exhaust gases, and consequently limit the pollution caused by such an engine.

In the case of an internal combustion engine equipped with a turbocompressor, it is known to recycle the exhaust gases by extracting these between the cylinder outlet and the inlet of a turbine of the turbocompressor which is driven by the exhaust gases of the internal combustion engine.

Additionally, it is also known to implement this recirculation of exhaust gases by extracting these downstream of the turbine of the turbocompressor which is driven by the exhaust gases from the internal combustion engine.

The two recirculation solutions are implemented by separate means installed on the periphery of the internal combustion engine. This represents a drawback since it is now necessary to duplicate certain components constituting these solutions. For example, implementation of both recirculation solutions requires the use of two electrical control wiring harnesses, two devices authorizing or prohibiting the circulation of the exhaust gas, and two means for controlling these devices.

The object of the present invention is therefore to resolve the drawback described above, in principle by combining in one housing the devices authorizing or prohibiting the recirculation of exhaust gases extracted firstly from a take-off between the exhaust outlet from the internal combustion engine and the inlet to the turbine which is driven by the exhaust gases, and secondly from a take-off arranged downstream of this turbine in the direction of flow of the exhaust gases.

The object of the invention is therefore a valve able to control an exhaust gas recirculation system of an internal combustion engine equipped with a turbine installed in an exhaust circuit of the internal combustion engine, said valve comprising a body allowing a circulation of a first flow of exhaust gas extracted upstream of the turbine and a circulation of a second flow of exhaust gas extracted downstream of the turbine, said valve being configured to control the circulation of the first and second flows of exhaust gas through said body.

According to a first characteristic of the invention, the valve comprises a first means able to control the circulation of the first flow of exhaust gas and a second means able to control the circulation of the second flow of exhaust gas.

The first means may be separate from the second means, in contrast to the case where a single means allows control of the circulation of both the first and the second flows. The first means and the second means may be formed by elements which are separate from one means to the other, in contrast to the case where the same piston or same flap would, depending on its position, allow this control of circulation of both the first and the second flow.

The body may at least partly receive the first means and the second means.

According to a second characteristic of the invention, the first means controls the circulation of the first flow of exhaust gas by a translational movement, whereas the second means controls the circulation of the second flow of exhaust gas by a rotational movement.

According to another characteristic of the invention, the valve comprises a drive means which controls the first means and the second means, in particular via a first drive device, a second drive device and a third drive device interposed between the first drive device and the second drive device.

According to yet another characteristic of the invention, the valve comprises the first drive device which drives the first means in rotation, the latter imposing at least one translational movement, and advantageously a helicoidal movement, on a first sealing element of a first duct arranged in the body.

According to another characteristic of the invention, the second drive device is provided which drives the second means in rotation, the latter imposing a rotational movement on a second sealing element of a second duct arranged in the body.

The first drive device and the second drive device are configured to prohibit simultaneous opening of the first sealing element and the second sealing element.

Advantageously, the first means comprises a first guide case linked in rotation to a lifting bar which is rotationally integral with a shaft fixed to the first sealing element, the shaft comprising two ends engaged in helicoidal grooves arranged on the body, wherein the latter term includes grooves made directly in the body or in any intermediate piece fixed to the body.

Further advantageously, the closure of the first sealing means is achieved by a first spring means.

Alternatively or additionally to the abovementioned closure, the invention provides that the closure of the first sealing means is achieved by the first guide case.

According to a first characteristic of the invention, the first guide case moves along a first angular sector during which it controls a closure of the first sealing element, and along a second angular sector during which the first sealing element is held closed.

Structurally, such a first guide case comprises a skirt on which an undercut is arranged, a first segment of the skirt which delimits the undercut acts on the lifting bar to open the first sealing element, a second segment of the skirt which delimits the undercut acts on the shaft fixed to the first sealing element to close the first sealing element, said undercut comprising a clearance zone from the lifting bar.

According to another characteristic of the invention, the second means comprises a second guide case, on a skirt of which a recess is provided, said recess authorizing a rotational movement of the second guide case without driving the second sealing element in rotation.

Finally it is noted that closure of the second sealing means is achieved by a second spring means.

A first advantage according to the invention lies in the omission of one of the duplicated components, such as an electrical control wiring harness, a body or means, in particular an electric motor, for controlling one of the devices authorizing or prohibiting the circulation of recycled exhaust gas. Consequently this allows a reduction in the weight of the on-board components in the vehicle equipped with the internal combustion engine and the valve according to the invention. This therefore allows simpler control of the recirculation system. Finally this allows a reduction in the cost price of the exhaust gas recirculation function.

Other characteristics, details and advantages of the invention will arise more clearly from reading the description given below for information, in relation to the drawings in which:

FIG. 3 is a diagrammatic view of the constituent components of the valve according to the invention;

FIG. 4 is a diagrammatic view of the constituent components of the valve according to the invention;

Figure 1:
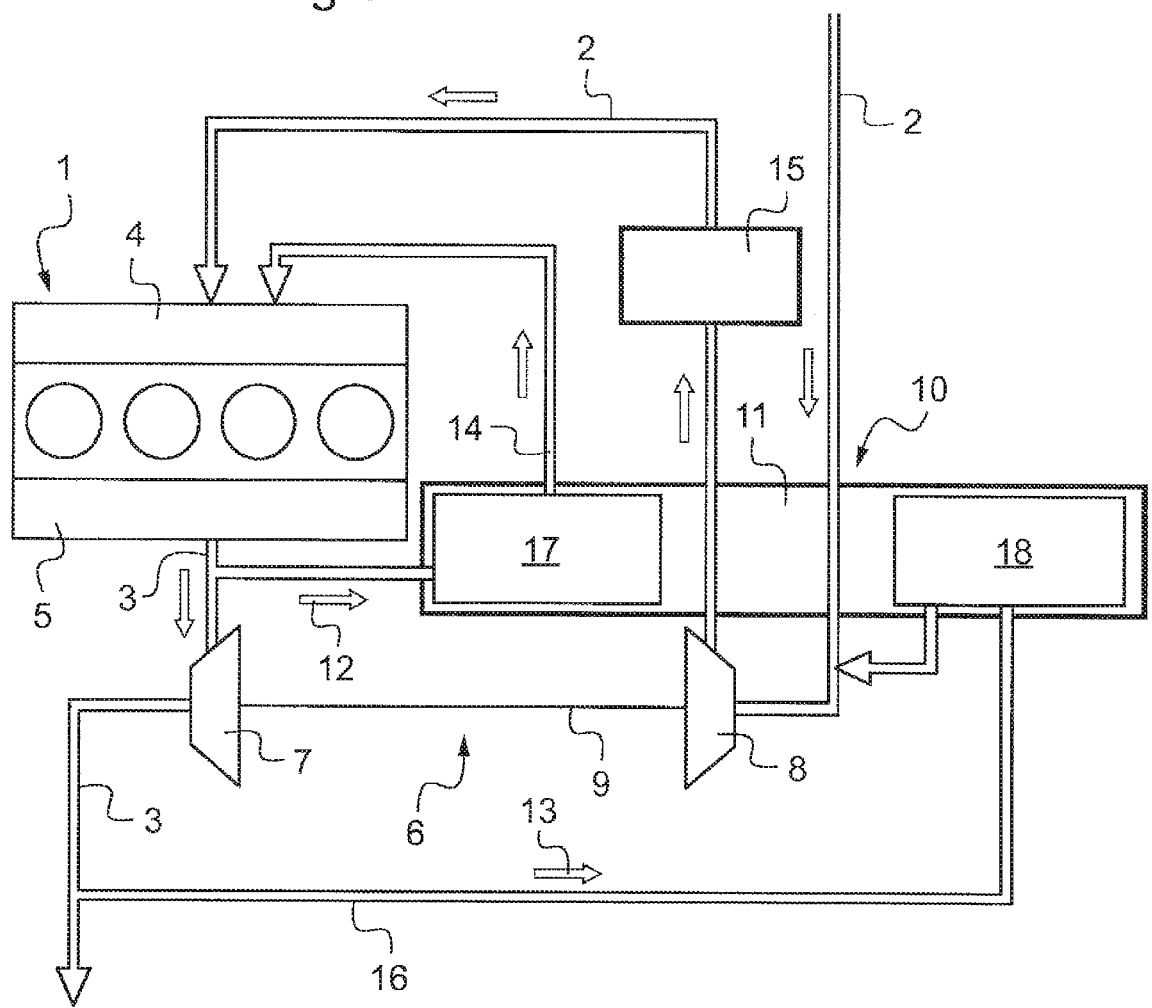
FIG. 1 is a diagrammatic view of the exhaust gas recirculation system of a turbocharged internal combustion engine incorporating the valve according to the invention.

FIG. 1 shows an internal combustion engine 1 equipped with its air intake circuit 2 and its exhaust circuit 3. This internal combustion engine 1 is depicted symbolically and comprises an intake manifold 4 intended to distribute the volume of intake air into the cylinders of the internal combustion engine. It also comprises an exhaust manifold 5, the function of which is to combine the exhaust gases in order to direct them towards the exhaust circuit 3.

This internal combustion engine is furthermore equipped with a turbocompressor 6 which comprises a turbine 7 driven by the exhaust gases, this turbine 7 being connected to a compressor 8 via a shaft 9. The compressor 8 is itself installed in the intake circuit so as to compress the air for intake. Between the compressor 8 and the intake manifold 4 is an air metering unit 15, for example a butterfly housing, which controls the quantity of intake air into the internal combustion engine 1 as a function in particular of the demand from the driver of the motor vehicle equipped with said internal combustion engine.

Such an internal combustion engine 1 comprises an exhaust gas recirculation system. For this, a valve 10 according to the invention is provided, which is fitted to the internal combustion engine 1. This valve 10 comprises a body 11 configured to control a circulation of a first flow 12 of exhaust gas extracted upstream of the turbine 7, and a second flow 13 of exhaust gas extracted downstream of the same turbine 7.

This valve 1 is also arranged firstly to conduct this first flow 12 of exhaust gas to a portion of the intake circuit 2 situated here downstream of the compressor 8, and secondly to conduct this second flow 13 of exhaust gas to a portion of the intake circuit situated here upstream of the compressor 8.

The exhaust circuit 3 therefore comprises a high-pressure pipe 14 which starts at a take-off from the exhaust circuit 3 between the outlet from the exhaust manifold 5 and an inlet to the turbine 7. This high-pressure pipe 14 is then connected to the body 11 of the valve 10, then leaves this before rejoining the intake circuit 2 at a point situated downstream of the intake air metering unit 15, advantageously at a connection point on the intake manifold 4.

The exhaust gas recirculation system also comprises a low-pressure pipe 16 which begins on the exhaust circuit 3 at a take-off downstream of the turbine 7. This low-pressure pipe 16 is also connected to the body 11 of the valve 10, and leaves this before rejoining the intake circuit 2 at a connection point arranged upstream of the compressor 8 of the turbocompressor 6.

According to the invention, the valve 10 is configured to allow or interrupt the circulation of exhaust gases in the high-pressure pipe 14 and in the low-pressure pipe 16. Naturally the valve 10 is arranged to assume all intermediate positions between a fully closed position and a fully open position, whereby it is able to control a determined quantity of exhaust gas which circulates in the high-pressure pipe 14 or in the low-pressure pipe 16.

The circulation of the first flow 12 of the exhaust gas in the high-pressure pipe 14 is dependent on the first means 17 which is housed inside the body 11 of the valve 10. The same applies to the second flow 13 of exhaust gas which circulates in the low-pressure pipe 16, circulation of this second flow 13 being dependent on a second means 18 fixed to or installed in the body 11 of the valve 10. It will be understood from this that the first means 17 is able to control the first flow of exhaust gas and the second means 18 is able to control the second flow of exhaust gas, the first means and the second means 18 being integral with the body. It is noted that, apart from their common control, this first means 17 and the second means 18 are formed as separate pieces.

The body 11 of the valve 10 forms for example a single unitary piece, and the high-pressure pipe 14 and low-pressure pipe 15 are connected to this body 11.

Figure 2:
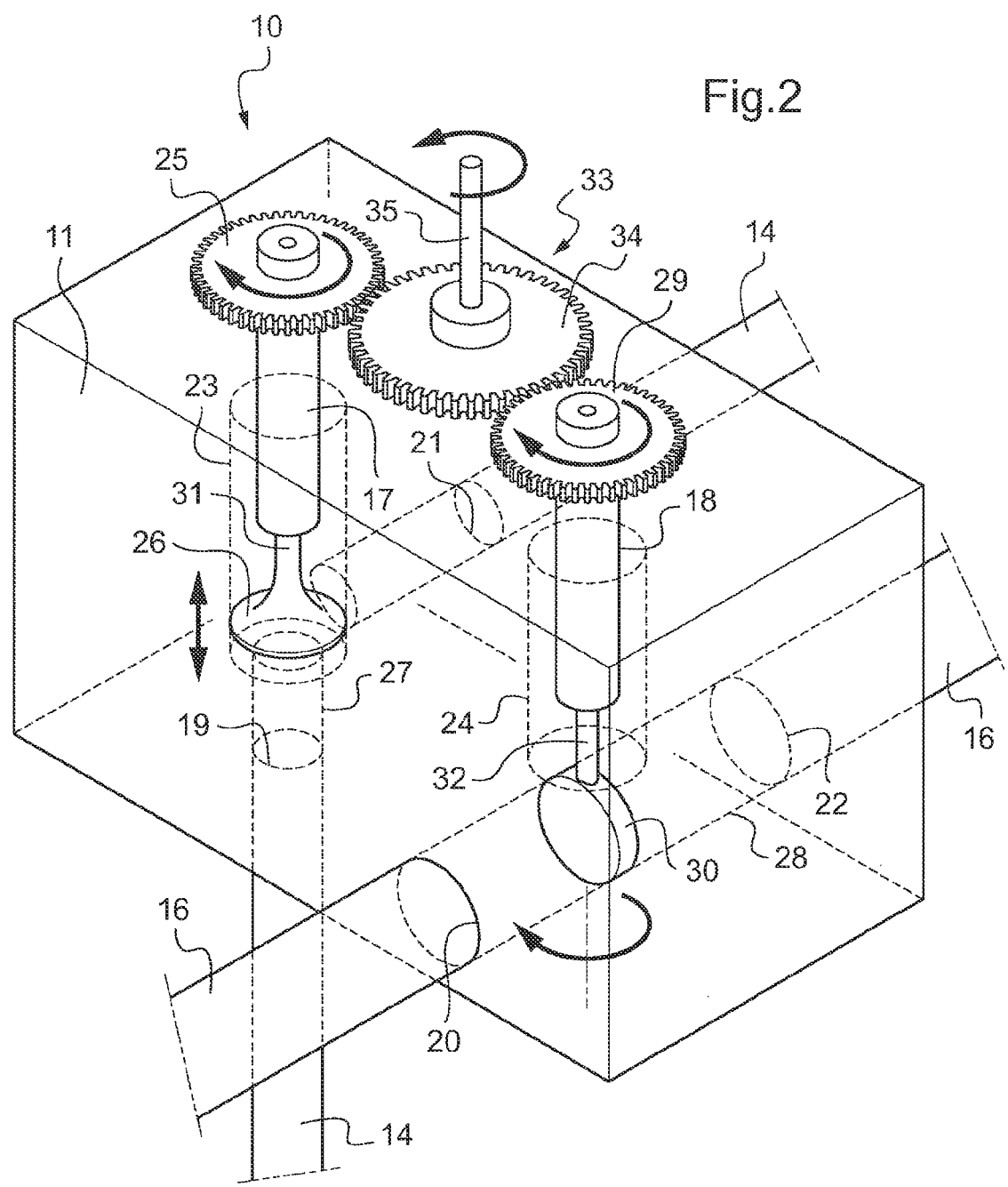
FIG. 2 is a diagrammatic view of the valve according to the invention.

FIG. 2 shows in detail the structure of the valve 10 according to the invention. The body 11 forms a block, for example made of an aluminum alloy or a steel, which has two inlets and two outlets.

A first inlet 19 is connected to a portion of the high-pressure pipe 14 which comes from the take-off made between the outlet from the exhaust manifold and the inlet to the turbine, i.e. upstream of the turbine. A second inlet 20 is made on a face of the body 11 and receives a portion of the low-pressure pipe which is connected to the exhaust circuit downstream of the turbine.

The body 11 comprises a first outlet 21, made for example on one of the faces of this body, this outlet being connected to a portion of the high-pressure pipe which is connected to the intake circuit downstream of the air metering unit, for example on the intake manifold.

The body 11 also comprises a second outlet 22 arranged on a face of the body. This second outlet 22 is connected to a portion of the low-pressure pipe which conducts the second flow of exhaust gas into the intake circuit upstream of the compressor.

The body 11 comprises a first duct 27 made inside the body 11 and connected on one side to the first inlet 19 and to the first outlet 21. The first means 17 is placed on the route of the first flow of exhaust gas inside the first duct 27.

The body also comprises a second duct 28 arranged inside the body 11 of the valve 10. This second duct 28 is connected to the second inlet 20 and to the second outlet 22, the second means 18 being placed on the route of the second flow of exhaust gas in the second duct 28.

The body 11 furthermore comprises a first housing 23, for example of cylindrical section, which receives the first means 17, wherein the latter is here depicted symbolically but will be shown in detail in FIG. 3.

The second means 18 is also depicted symbolically and FIG. 4 reveals the details. The second means 18 is however installed in a second housing 24 made in the body 11 of the valve 10.

FIG. 2 also shows the type of movement implemented by the first means 17 or second means 18 to control the circulation of the first flow and/or the second flow of the exhaust gas.

To control the circulation of the first flow of exhaust gas, the first means 17 generates a translational movement.

According to one embodiment, the first means 17 receives a rotational movement from a first drive device 25 and transforms this rotational movement into a translational movement intended to control a first sealing element 26 of the first duct 27. For example, the first sealing element is a valve which rests on a seat provided in the body 11, this valve being linked to the first means 18 by a first rod 31.

The second means 18 controls the circulation of the second flow of exhaust gas in the second duct 28 by a rotational movement. The second means 18 therefore receives this rotational movement from a second drive device 29, the second means 18 acting mechanically on a second sealing element 30 installed in the second duct 28. The second sealing element 30 is formed in particular by a butterfly-type valve linked to the second means 18 by a second rod 32.

As one exemplary embodiment, it is noted that the first drive device 25 and the second drive device 29 extend over one of the faces of the body 11 so as to facilitate access. These two drive devices are for example placed in the same plane. Alternatively they are placed in parallel but separate planes.

For example, the first drive device 25 and the second drive device 29 are formed by a toothed wheel or a gear.

The valve 10 according to the invention comprises a drive means 33 which controls both the first means 17 and the second means 18. It is understood here that the valve 10 is fitted with a single drive means to control both the circulation of the first flow of exhaust gas and the circulation of the second flow of exhaust gas.

The drive means 33 comprises a third drive device 34 which takes the form for example of a toothed wheel which engages both on the first drive device 25 and on the second drive device 29. This may be a single toothed wheel but it can also be a cascade of pinions allowing a reduction or increase in the rotation speed of the first means 17 in relation to the second means 18. It is noted that the first means 17 is therefore linked to the second means 18 by the drive means 33.

The third drive device 34 is linked to an actuator rod which may be connected to an electric actuator mounted on or in the body 11 of the valve 10. It may for example be an electric motor, in particular a DC motor with controlled current level.

The valve 10 may also be configured to prohibit simultaneous opening of the first sealing element 26 and the second sealing element 30. The first means 17 and the second means 18 therefore each comprise clearance or release zones whereby, while the first drive device is turning, the first sealing element does not move. Such a kinematic will be clearer from FIGS. 3 to 8.

FIG. 3 shows details of the first means 17 installed in the body 11 of the valve 10.

The first means 17 comprises a first guide case 36 linked in rotation to a lifting bar 37 which is rotationally integral with a shaft 38 fixed to the first sealing element 26.

The function of this first guide case 36 is to control the transmission of the rotational movement from the first drive device 25 (here depicted symbolically) to the lifting bar 37. In other words, the first guide case 36 turns along a first angular sector where it drives the lifting bar 37 in rotation, and along a second angular sector during which the lifting bar 37 is immobile.

To achieve this, the first guide case 36 comprises a skirt 39 on which an undercut 40 is arranged, the latter having an inverted L-shape.

The edges of this undercut 40 comprise a first segment 41 of the skirt 39 which acts on the lifting bar 37 to open the first sealing element 26, which allows the first flow of exhaust gas to circulate in the first duct.

This undercut also delimits a second segment 42 of the skirt 39 which acts on the shaft 38 to close the first sealing element 26 as required. It is noted that closure of the first sealing element is ensured as priority by a first spring means 43 installed between the body 11 of the valve and the lifting bar 37. The first spring means 43 then acts on the lifting bar 37 which acts on the shaft 38. The closure can also be achieved under the action of the first drive device 25, in a manner supplementary to the action of the first spring means 43, in order to facilitate closure of the first sealing element 26, in particular when the force of the first spring means is insufficient to close this sealing element. Such a situation would arise for example when impurities or scale hinder the movement of the first sealing element 26. The second segment 42 of the skirt 39 then acts on the shaft 38, the lifting bar 37 being naturally driven in the same movement.

The undercut finally delimits a clearance zone 44, also called a release window, of the lifting bar 37. This clearance zone 44 is a portion of the undercut 40 which authorizes a rotation of the first guide case 36 without driving the lifting bar 37 in rotation.

The first guide case 36 then moves along a first angular sector during which it is able to control the closure of the first sealing element 26, and along a second angular sector during which the first sealing element 26 is held closed. A rotation in the opposite direction also leads to the opening of the first sealing element when the first segment 41 comes to drive the lifting bar 37.

This lifting bar 37 is for example a cylindrical tube which comprises a transverse rib 46, this rib passing through the middle of the cylindrical tube 45. The cylindrical tube furthermore comprises a slot 47 produced longitudinally, i.e. along an axis parallel to a central axis of the cylindrical tube 45.

This slot 47 receives the shaft 38, the latter being linked integrally to the first rod 31. This shaft 38 extends in a direction perpendicular to the direction of extension of the first rod 31 and in particular comprises at each end a bearing 48, wherein the latter may for example be implemented by a wheel on a pivot link, or by a roller bearing.

The ends of this shaft 38, in particular the bearings 48, are engaged in helicoidal grooves 49 integral with the body 11 and produced either directly on the latter or on an intermediate piece fixed in the body 11. These helicoidal grooves 49 form a cam-way which drives the sealing element 26 in translation when the shaft 38 is driven in rotation by the lifting bar 37.

The lifting bar 37, the helicoidal grooves 49 and the shaft 38 thus transform the rotational movement imposed by the first guide case 36 into a reversible translational movement executed by the first sealing element 26.

In this exemplary embodiment, the spring means 43 is a spring, of which the coils are wound around the lifting bar 37, a first end of which is linked to the body 11, and the other end of which is linked to the lifting bar 37.

FIG. 4 shows diagrammatically the structure of the second means 18. The latter is integral with the second drive device 29, here shown diagrammatically.

This second means 18 comprises a second guide case 50 consisting of a base and a peripheral skirt 51. On or through this skirt is arranged a first recess 52, the function of which is to authorize a rotational movement of the second guide case without the latter driving the second sealing element 30 in rotation. The first recess 52 has a rectangular form. A second recess (not shown), identical in form to the first recess 52, may also be provided on the skirt 51 of the second guide case 50 in a manner diametrically opposed to the first recess 52.

The second sealing element 30 is integral with the second rod 32, the free end of the latter supporting a transverse actuating bar marked 54. The latter extends in a direction perpendicular to the direction of extension of the second rod 32, which is fixed to the transverse bar 54 substantially in the middle of the bar.

At least one end, and advantageously both ends, of the transverse bar 54 is received in the first 52 and/or second recesses such that the edges 55 or 56 impose a rotational movement, which is reflected by an opening or closing of the second sealing element 30 so as to authorize or prohibit the circulation of the second flow of exhaust gas in the second duct.

Closure of the second sealing element is achieved by the force of the second spring means 57. The latter takes for example the form of a coil spring, a first end of which is fixed to the transverse bar 54, while a second end is attached to the body 11 of the valve 1 according to the invention.

FIGS. 5 to 8 show the movements of the constituent components of the first means 17 and second means 18. The first guide case 36 and the second guide case 50 move in rotation, but the diagrammatic representation given here is illustrated on one plane. The figures show pairs of drawings illustrating respectively the first and/or second drive means, which are linked together by the drive means not shown here. The first guide case 36 and the second guide case 50 turn simultaneously and advantageously in opposite directions.

Figure 5:
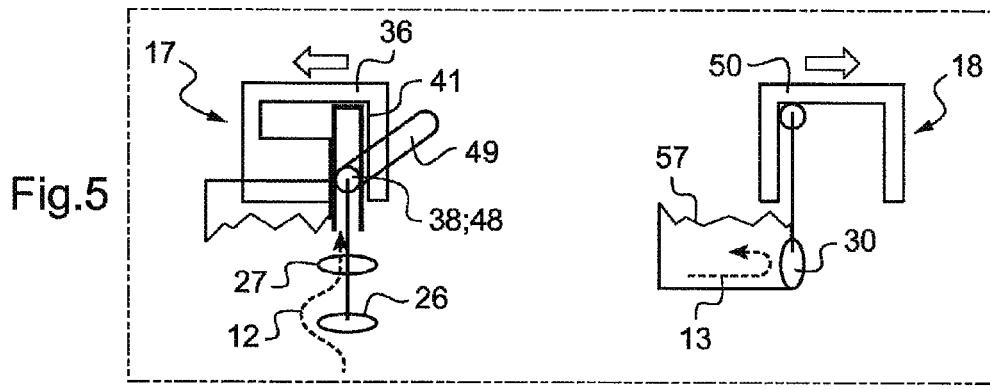
FIG. 5 is a diagrammatic view showing the relative movement of these components placed in a first position.

FIG. 5 shows a situation where the first sealing element 26 authorizes the circulation of the first flow of exhaust gas in the first duct 27. The first sealing element is held in this open position by the first segment 41 of the first guide case, the bearing 48 being situated at a first end of the helicoidal groove 49.

For its part, the second sealing element 30 is held in a closed position in which it prohibits any circulation of the second flow 13 of exhaust gas. This retention is ensured by the force exerted by the second spring means 57.

Figure 6:
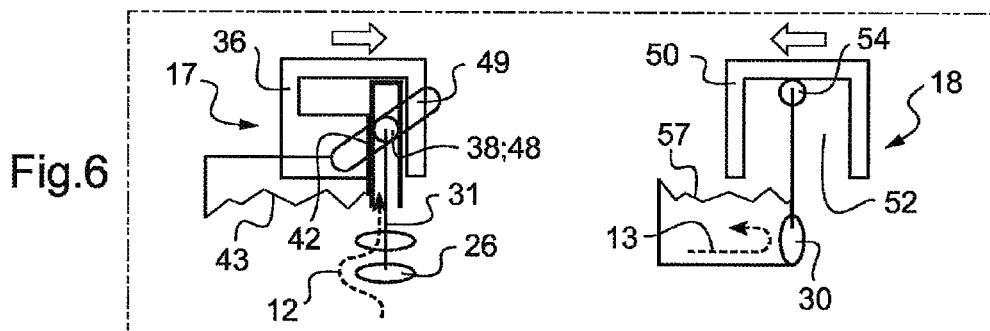
FIG. 6 is a diagrammatic view showing the relative movement of these components placed in a second position.

When the valve receives an instruction to close the high-pressure circuit, the instruction is translated by the movement shown in FIG. 6, the latter showing an intermediate position of the first sealing element 26.

The first guide case 36 is set in rotation in order to allow a movement of the bearing 48 in the helicoidal groove 49. Such a movement is reflected by a translation of the assembly consisting of the first sealing element, the first rod 31 and the shaft 38. The rotational movement is imposed by the force of the first spring means 43. If for reasons mentioned above, this force is insufficient to drive the rotation, the second segment 42 exerts a supplementary force on the shaft which is fixed to the first rod 31.

As in FIG. 5, the second sealing element 30 is held closed by the second spring means. However the second guide case 50 moves in rotation but without acting on the transverse bar 54, since this is housed in the recess 52.

Figure 7:
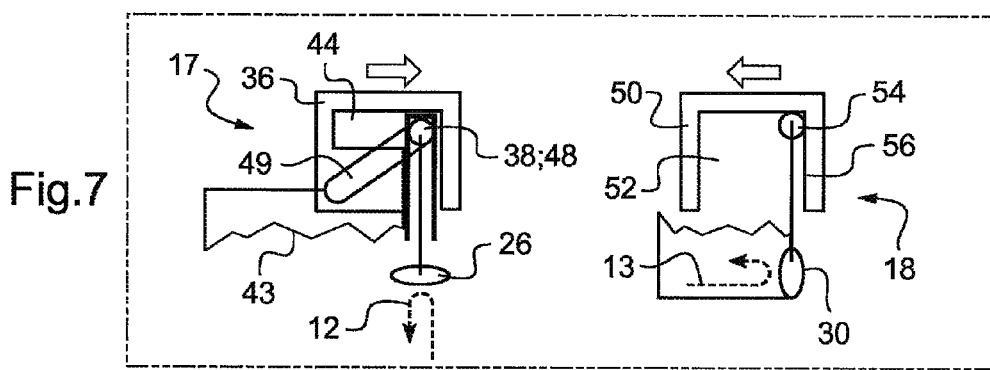
FIG. 7 is a diagrammatic view showing the relative movement of these components placed in a third position.

FIG. 7 shows the rest position of the first means 17 and second means 18. This rest position corresponds to a closure of the first duct achieved by the first sealing element 26, the second duct still being closed by the second sealing element 30.

The first guide case 36 has continued its rotational movement until the bearing 48 reaches a second end of the helicoidal groove 49. At this stage, the shaft 38 extends into the clearance zone 44. The first sealing element 26 is then held closed by the first spring means 43.

The second guide case 50 has also continued its rotational movement until the transverse bar 54 comes to rest against the edge 56 which delimits the recess 52 made on the second guide case 50. As already stated, at this stage the second sealing element 50 still remains closed.

Figure 8:
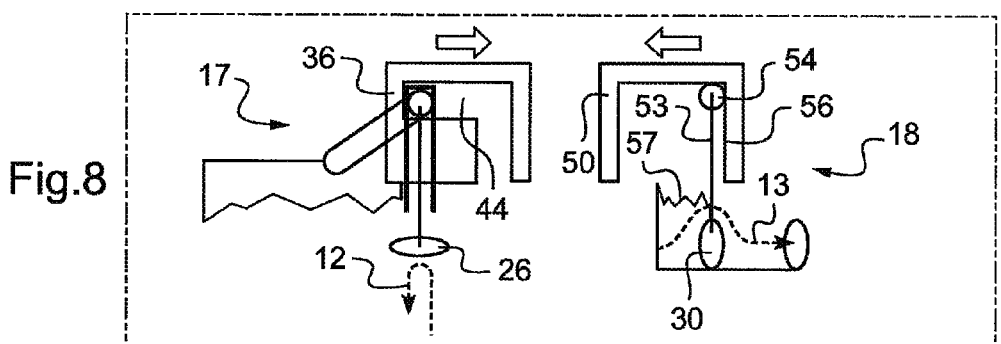
FIG. 8 is a diagrammatic view showing the relative movement of these components placed in a fourth position.

FIG. 8 shows a situation where the low-pressure circuit is open while the high-pressure circuit is closed.

The clearance zone 44 has allowed the first guide case 36 to turn without driving the shaft 38 in rotation. The position of the first sealing element 26 is unchanged in relation to that shown in FIG. 7.

The rotation of the second guide case 50 causes a contact between the edge 56 and the transverse bar 54, which is reflected by the rotation of the second rod 32 and, by correlation, the second sealing element 30. The second spring means 57 is then subjected to the force exerted on rotation of the transverse bar 54.

FIGS. 5 to 8 thus show the kinematic of the different components of the first means 17 and second means 18, and it is noted that the valve 1 is configured to prohibit any simultaneous opening of the first sealing element 26 and the second sealing element 30. In other words, the first means 17 and the second means 18 are arranged to authorize the circulation of the first flow 12 of exhaust gas, or to authorize the circulation of the second flow 13 of exhaust gas, in a selective fashion.

The terms "upstream" and "downstream" used above relate to the direction of movement of the fluid concerned, air or exhaust gas, in the component concerned.

The invention claimed is:

1. A valve for controlling an exhaust gas recirculation system of an internal combustion engine equipped with a turbine installed in an exhaust circuit of the internal combustion engine, said valve comprising:
    a body allowing a circulation of a first flow of exhaust gas extracted upstream of the turbine and a circulation of a second flow of exhaust gas extracted downstream of the turbine, said valve being configured to control the circulation of the first and second flows of exhaust gas through said body;
    a first piston valve able to control the circulation of the first flow of exhaust gas;
    a second flap able to control the circulation of the second flow of exhaust gas, the first piston valve being separate from the second flap;
    a first drive device for driving the first piston valve in rotation, the latter imposing at least one translational movement on a first sealing element of a first duct arranged in the body,
    wherein the first piston valve comprises a first guide case linked in rotation to a lifting bar which is rotationally integral with a shaft fixed to the first sealing element, the shaft comprising two ends engaged in at least one helicoidal groove arranged on the body,
    wherein the first guide case moves along a first angular sector during which it controls a closure of the first sealing element, and along a second angular sector during which the first sealing element is held closed, and
    wherein the first guide case comprises a skirt on which an undercut is arranged, a first segment of the skirt which delimits the undercut acts on the lifting bar to open the first sealing element, a second segment of the skirt which delimits the undercut acts on the shaft to close the first sealing element, said undercut comprising a clearance zone from the lifting bar; and
    wherein said clearance zone authorizes rotation of the first guide case without driving the lifting bar in rotation.

2. The valve as claimed in claim 1, said body at least partly receiving the first piston valve and the second flap.

3. The valve as claimed in claim 1, wherein the first piston valve controls the circulation of the first flow of exhaust gas by at least one translational movement whereas the second flap controls the circulation of the second flow of exhaust gas by a rotational movement.

4. The valve as claimed in claim 1, further comprising a drive unit which controls the first piston valve and the second flap.

5. The valve as claimed in claim 1, wherein the closure of the first sealing element is achieved by a first spring coil.

6. The valve as claimed in claim 1, wherein the closure of the first sealing element is achieved by the first guide case.

7. A valve for controlling an exhaust gas recirculation system of an internal combustion engine equipped with a turbine installed in an exhaust circuit of the internal combustion engine, said valve comprising:
 a body allowing a circulation of a first flow of exhaust gas extracted upstream of the turbine and a circulation of a second flow of exhaust gas extracted downstream of the turbine, said valve being configured to control the circulation of the first and second flows of exhaust gas through said body;
 a first piston valve able to control the circulation of the first flow of exhaust gas;
 a second flap able to control the circulation of the second flow of exhaust gas, the first piston valve being separate from the second flap;
 a first drive device for driving the first piston valve in rotation, the latter imposing at least one translational movement on a first sealing element of a first duct arranged in the body; and
 a second drive device for driving the second flap in rotation, the latter imposing a rotational movement on a second sealing element of a second duct arranged in the body,
 wherein the first piston valve and the second flap are configured to prohibit simultaneous opening of the first sealing element and the second sealing element, and wherein a rest position of the first piston valve corresponds to a closure of the first duct achieved by the first sealing element, the second duct still being closed by the second sealing element.

8. The valve as claimed in claim 7, wherein closure of the second sealing element is achieved by a second spring coil.

9. A valve for controlling an exhaust gas recirculation system of an internal combustion engine equipped with a turbine installed in an exhaust circuit of the internal combustion engine, said valve comprising:
 a body allowing a circulation of a first flow of exhaust gas extracted upstream of the turbine and a circulation of a second flow of exhaust gas extracted downstream of the turbine, said valve being configured to control the circulation of the first and second flows of exhaust gas through said body;
 a first piston valve able to control the circulation of the first flow of exhaust gas;
 a second flap able to control the circulation of the second flow of exhaust gas, the first piston valve being separate from the second flap;
 a first drive device for driving the first piston valve in rotation, the latter imposing at least one translational movement on a first sealing element of a first duct arranged in the body; and
 a second drive device for driving the second flap in rotation, the latter imposing a rotational movement on a second sealing element of a second duct arranged in the body,
 wherein the second flap comprises a second guide case on a skirt in which at least one first recess is provided, said first recess authorizing a rotational movement of the second guide case without driving the second sealing element in rotation.

* * * * *